Dec. 3, 1957  L. R. VOGEL  2,814,983
TWINELESS HAY BALE STITCHER
Filed April 5, 1955  2 Sheets-Sheet 1
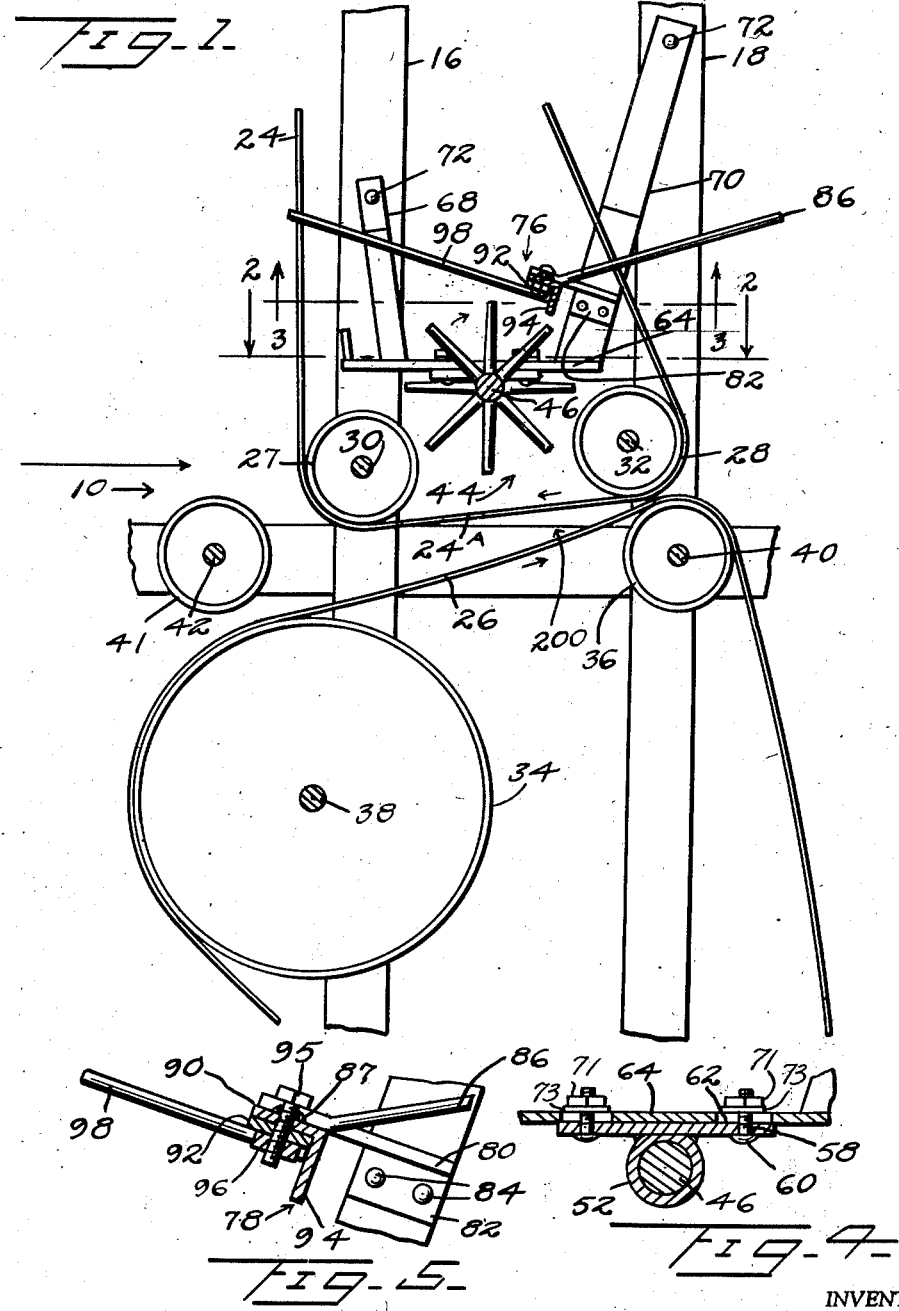
INVENTOR
L. R. Vogel
BY Kimmel & Crowell
ATTORNEYS

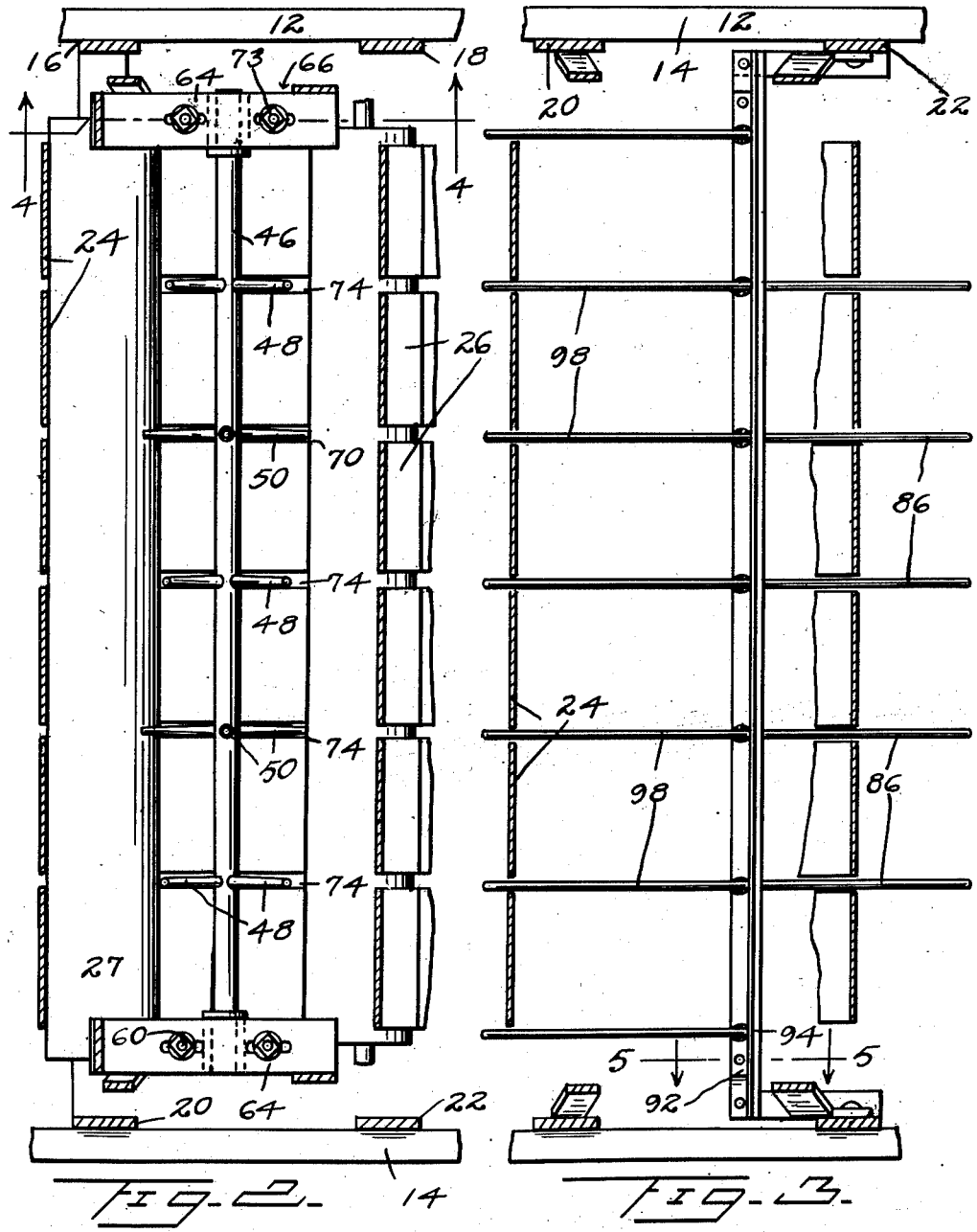

2,814,983

TWINELESS HAY BALE STITCHER

Leo R. Vogel, Leader, Minn., assignor to Samuel Sewall, Minneapolis, Minn.

Application April 5, 1955, Serial No. 499,389

1 Claim. (Cl. 100—88)

This invention relates to an attachment for a hay or straw baling machine, and more specifically, the invention pertains to an attachment for a baling machine for forming bales of hay or straw without the use of twine, cord, or wire.

One of the primary objects of this invention is to provide an attachment for a hay or straw baling machine forming cylindrical bales, the attachment insuring strong tight bales which will withstand rough handling and impregnation by precipitation under inclement weather conditions.

Another object of this invention is to provide an attachment for a straw or hay baling machine of the type referred to above which may be easily installed without the use of special tools.

A further object of this invention is to provide a twineless stitching attachment for a hay or straw baling machine which will selectively and firmly secure bales having varying diameters.

A still further object of this invention is to provide a twineless stitching attachment for hay baling machines of the type referred to above which is positive in operation and economical in power consumption.

This invention contemplates, as a further object, the provision of an attachment for a straw or hay baling machine, which will compactly secure cylindrical bales of varying densities, the securing being accomplished without the use of ties.

It is within the purview of this invention to provide an attachment of the type to which reference has been made supra which is inexpensive to manufacture, non-complex in construction and assembly, and durable in use.

Other and further objects and advantages of the present invention will become more manifest from a consideration of the following specification when read in conjunction with the annexed drawings, in which:

Figure 1 is a side elevational view of a conventional hay or straw baling machine forming cylindrical bales and equipped with a bale stitching attachment constructed in accordance with this invention, the proximate portions of the baler frame being omitted for the clarity of illustration.

Figure 2 is an enlarged cross-sectional view taken on the horizontal plane of line 2—2 of Figure 1, looking in the direction of the arrows.

Figure 3 is an enlarged cross-sectional view taken on the horizontal plane of line 3—3 of Figure 1, looking in the direction of the arrows.

Figure 4 is an enlarged fragmentary detail cross-sectional view taken on the horizontal plane of line 4—4 of Figure 2, looking in the direction of the arrows.

Figure 5 is an enlarged fragmentary detail cross-sectional view taken on the horizontal plane of line 5—5 of Figure 3, looking in the direction of the arrows.

Referring now more specifically to the drawings, reference numeral 10 designates, in general, the chassis of a conventional hay or straw baling machine for forming cylindrical bales. As illustrated therein, the chassis includes a pair of elongated substantially rectangular oppositely disposed spaced and parallel side frame members 12, 14. To each of these side frame members are fixedly secured a pair of oppositely disposed confronting vertical standards 16, 18 and 20, 22, respectively. The baler machine is provided with a plurality of upper and lower endless bale forming belts 24 and 26 of which the belts 24 are trained around the drive roller 27, a bale trip roller 28 and an upper tension roller (not shown). The rollers 27 and 28 are supported on axles 30 and 32, respectively, having their opposed ends journalled in suitable bearings (not shown) fixedly connected with the chassis 10.

The belts 26 are trained around a lower drive roller 34, a trip roller 36 and a tension roller (not shown). These rollers are carried on axles 38 and 40, respectively, which are journalled in bearings (not shown) rigidly secured to the chassis 10.

A spring loaded tension or press roller 40 is mounted on the chassis 10 above and in spaced relation relative to the belts 26. Suitable bearings are provided for the opposed ends of the axle 42 which mounts the roller 41.

The above referred to elements comprise conventional components of a hay or straw baling machine for forming cylindrical bales and in and of themselves, per se, form no part of the present invention.

The stitching attachment to which this invention does pertain is generally designated at 44 and is seen to comprise an elongated shaft 46 having a plurality of radially extending stitching fingers 48, 50 fixedly secured thereon, the fingers 48 and 50 being staggered with respect to each other. The opposite ends of the shaft 46 are rotatably mounted in bearings 52 having a pair of transversely extending apertures 58 which receive therein a pair of bolts 60, respectively. The bolts 60 project through a pair of elongated slots 62 formed in the bight portion 64 of a substantially U-shaped bracket 66 having a pair of upwardly diverging arms 68, 70. The bolts 60 adjustably secure the bearings 52 on the bight 64 by means of lock nuts 71 and washers 73. The upper ends of the arms 68, 70 are releasably secured to the standards 16, 18 as by the bolts 72. As is seen in Figure 1, the stitcher 44 is positioned intermediate the drive roller 27 and the trip roller 28 in spaced relation relative to the lower belt portion 24A, and the radial fingers are disposed above the spaces 74 between each adjacent pair of belts 24.

A belt spacer 76 is provided and comprises an elongated inverted substantially L-shaped angle iron 78 having a lateral extension 80 at each end which terminate in depending flanges 82 fixedly secured to the arms 70 by rivets 84. A plurality of elongated substantially cylindrical spacer rods 86 have one of their respective ends welded at 87 to the foot portion 90 of the L-iron, and the rods project laterally from one side thereof between the belts 24 as shown in Figures 1 and 3.

An elongated substantially rectangular plate 92 extends parallel to the foot portion 90 with an edge thereof engaging the leg portion 94 of the angle iron 78 and is releasably secured thereto by a plurality of bolts 95 and nuts 96. A plurality of longitudinally spaced substantially cylindrical spacer rods 98 have one of their respective ends fixedly secured to the plate 92 and project forwardly of the machine between adjacent pairs of belts 24 as shown in Figures 1 and 3.

From the foregoing description of the attachment constructed in accordance with the teachings of the present invention, the operation thereof is deemed to be substantially self-evident. Conveyor means (not shown) convey the hay or straw upwardly for original engagement with the lower bale forming bands 26 in contact with the lower drive roller 34 and between the pressure roller 41, Upon receiving this original compression, the hay moves rearwardly and upwardly between the confronting belt portions 24A, 26, and the belts 24 and 26 being driven through conventional means in opposite directions starts the rolling of the material into a small compact bale. As the bale increases in diameter, the positions of the trip rollers 28 and 36 change as well as that of the tension rollers (not shown) to increase the size of the bale forming chamber 200.

The increase in the size of the bale forming chamber 200 results as the confronting portions of the belts 24A and 26 move upwardly and downwardly, respectively, whereby the stitcher fingers 48 and 50 extend through the spaces between each adjacent pair of belts 24. As the material being baled builds up in diameter, the stitching fingers thrust deeper and deeper into the material to compact it in a very dense cylindrical configuration, the rotation of the material effecting a rotation of the fingers 48, 50 in the opposite direction. The compaction of the material continues until the proper size of bale has been completed, and the machine then automatically ejects the completed bale from between the trip rollers 28 and 36.

The twineless stitching attachment 44 will effectively compact baled material having any diameter up to the point that the circumference of the bale becomes tangent with the lower side of the shaft 46.

Having described and illustrated one embodiment of this invention, it will be understood that the same is offered merely by way of example, and that the invention is to be limited only by the scope of the following claim.

What is claimed is:

An attachment for a hay or straw baling machine having an expansible baling compartment formed of a plurality of spaced upper endless belts and a plurality of lower spaced endless belts, said upper and lower endless belts having portions disposed in confronting relation and movable apart to define said expansible compartment, said attachment comprising an elongated shaft positioned transversely of and within the closed loops defined by said upper endless belts, said shaft having a plurality of axially spaced and staggered material engaging fingers projecting radially therefrom, means mounting said shaft for rotation on said machine adjacent said compartment, said shaft mounting means including means for adjusting said shaft relative to said upper belts, and said fingers being positioned in confronting relation relative to the spaces between each adjacent pair of upper endless belts, whereby expansion of said chamber effects the projection of said fingers therein to cause the punching and compaction of the material being baled therein.

References Cited in the file of this patent
UNITED STATES PATENTS

| | | |
|---|---|---|
| 1,027,393 | Brown | May 21, 1912 |
| 2,096,990 | Luebben | Oct. 26, 1937 |